United States Patent [19]
Nakajima

[11] Patent Number: 5,907,699
[45] Date of Patent: May 25, 1999

[54] MICROCOMPUTER WITH TWO OSCILLATORS OF DIFFERENT FREQUENCIES SELECTABLE BY A RESET SIGNAL SET BY AN INSTRUCTION OR BY AN OVERFLOW SIGNAL OF A COUNTER

[75] Inventor: Toyokatsu Nakajima, Itami, Japan

[73] Assignees: Mitsubishi Denki Kabushiki Kaisha, Tokyo; Mitsubishi Electric Semiconductor Software Co., Ltd., Hyogo, both of Japan

[21] Appl. No.: 08/970,536

[22] Filed: Nov. 14, 1997

Related U.S. Application Data

[63] Continuation of application No. 08/398,240, Mar. 3, 1995, abandoned.

[30] Foreign Application Priority Data

Jun. 30, 1994 [JP] Japan .................................. 6-149745

[51] Int. Cl.[6] .............................. G06F 1/04; G06F 1/26
[52] U.S. Cl. ...................................... 395/556; 395/750.04
[58] Field of Search .............................. 395/556, 750.04; 364/270

[56] References Cited

U.S. PATENT DOCUMENTS

| | | |
|---|---|---|
| 4,229,699 | 10/1980 | Frissell ..................................... 327/114 |
| 4,322,580 | 3/1982 | Khan et al. ............................... 379/279 |
| 4,379,993 | 4/1983 | Holden ........................................ 327/20 |
| 4,490,581 | 12/1984 | Edwards et al. .......................... 379/279 |
| 4,538,272 | 8/1985 | Edwards et al. ............................ 371/61 |
| 4,653,054 | 3/1987 | Liu et al. .................................... 371/61 |
| 4,754,216 | 6/1988 | Wong .................................... 324/76.82 |
| 4,899,351 | 2/1990 | Bonke ....................................... 375/357 |
| 4,965,524 | 10/1990 | Patchen ....................................... 327/99 |
| 5,155,840 | 10/1992 | Niijima ..................................... 395/551 |
| 5,254,960 | 10/1993 | Hikichi ....................................... 331/46 |
| 5,261,082 | 11/1993 | Ito et al. ................................... 395/550 |
| 5,270,713 | 12/1993 | Isono .......................................... 341/55 |
| 5,289,050 | 2/1994 | Ogasawara ............................... 327/141 |
| 5,303,279 | 4/1994 | Fujii ........................................... 377/51 |
| 5,416,435 | 5/1995 | Jokinen et al. .......................... 327/113 |
| 5,475,324 | 12/1995 | Tomiyori .................................. 327/145 |
| 5,513,358 | 4/1996 | Lundberg et al. ....................... 395/750 |
| 5,535,379 | 7/1996 | Koura ....................................... 395/557 |

Primary Examiner—Thomas C. Lee
Assistant Examiner—Albert Wang
Attorney, Agent, or Firm—McDermott, Will & Emery

[57] ABSTRACT

A microcomputer incorporating two oscillation circuits for generating clocks having different frequencies, which can be driven even when an oscillator is connected only to one of the oscillation circuits, by counting the number of clock pulses of the first or the second oscillation circuit, and selecting the clock of the first or the second oscillation circuit according to the data latched in a latch circuit that is set by an overflow signal outputted when the count value overflows.

14 Claims, 13 Drawing Sheets

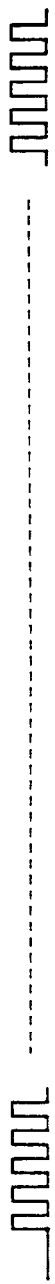
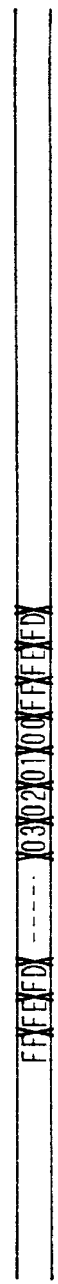
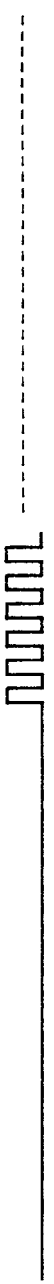
FIG. 4A IRST
FIG. 4B X
FIG. 4C COUNT VALUE
FIG. 4D OVF
FIG. 4E Q OUTPUT
FIG. 4F CLK

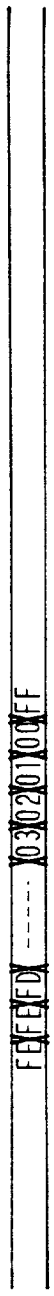
FIG. 6A IRST
FIG. 6B X
FIG. 6C COUNT VALUE
FIG. 6D OVF
FIG. 6E Q OUTPUT
FIG. 6F CLK
FIG. 6G COUNTER CURRENT Xc

X

COUNT VALUE

OVF

Q OUTPUT

ITR

MICROCOMPUTER WITH TWO OSCILLATORS OF DIFFERENT FREQUENCIES SELECTABLE BY A RESET SIGNAL SET BY AN INSTRUCTION OR BY AN OVERFLOW SIGNAL OF A COUNTER

This application is a continuation of application Ser. No. 08/398,240 filed Mar. 3, 1995 now abandoned.

BACKGROUND OF THE INVENTION

1. Field of the invention

The present invention relates to a microcomputer incorporating a plurality of oscillation circuits having different oscillation frequencies.

2. Description of the Related Art

A single chip microcomputer (hereafter referred to simply as microcomputer) used in a portable apparatus such as an electronic organizer which incorporates an oscillation circuit to generate low-frequency clocks for a timer in addition to an oscillation circuit to generate high-frequency clock pulses for a main clock, for the purpose of reducing the power consumption.

FIG. 1 is a block diagram showing the configuration of a prior art microcomputer of this type. A microcomputer 1 incorporates an oscillation circuit 2 to generate a high-frequency clock X having a predetermined frequency in a range from 1 to 10 MHz, an oscillation circuit 3 to generate a low-frequency clock Xc having a frequency of 32 kHz, a selector 4 connected to the two oscillation circuits 2, 3 to select either the high-frequency clock X or the low-frequency clock Xc and supply the selected clock to a CPU 5 and peripheral modules 6, 7, the CPU 5, the peripheral modules 6, 7 such as analog/digital converter, ROM, etc., and a timer 8 to keep time by counting the low-frequency clock pulses Xc. The microcomputer 1 is also provided with terminals 1a, 1b for the connection of an oscillator OSC1 to the oscillation circuit 2 and terminals 1c, 1d for the connection of an oscillator OSC2 to the oscillation circuit 3.

FIG. 2 is a block diagram showing the configuration of the selector 4. An initial reset signal IRST generated by the system to reset the microcomputer 1 when it is started up, and a set signal ST generated by a program are inputted to a set terminal S of an RS flip-flop 4b via an OR circuit 4a. A reset signal RST generated by the program is inputted to a reset terminal R of the RS flip-flop 4b. The Q output of the RS flip-flop 4b is inputted to one of input terminals of a first AND circuit 4c, and is inputted to one of input terminals of a second AND circuit 4f via an inverter 4d. Inputted to another input terminal of the first AND circuit 4c is the high-frequency clock X, and inputted to another input terminal of the second AND circuit 4f is the low-frequency clock Xc. Output signals of the first and the second AND circuits 4c, 4f are inputted to two input terminals of an OR circuit 4g, and the OR circuit 4g outputs the high-frequency clock X or the low-frequency clock Xc as a clock CLK to drive the CPU 5 and the peripheral modules 6, 7.

Now the operation of this microcomputer will be described below. To use the microcomputer 1, the oscillator OSC1 is connected between the terminals 1a and 1b, and the oscillator OSC2 is connected between the terminals 1c and 1d. When a power source for the microcomputer 1 is turned on, the system generates an initial reset signal IRST, and the initial reset signal IRST is inputted, via the OR circuit 4a, to the set terminal S of the RS flip-flop 4b to set the RS flip-flop so that the Q output is turned to be "1". Also when the power source is turned on, the oscillation circuits 2, 3 both oscillate so that the high-frequency clock X is outputted from the oscillation circuit 2 and the low-frequency clock Xc is outputted from the oscillation circuit 3, then the high-frequency clock X is inputted to the AND circuit 4c of the selector 4 and the low-frequency clock Xc is inputted to the AND circuit 4f of the selector 4. The low-frequency clock Xc is inputted also to the timer 8 to drive the timer 8.

As the RS flip-flop 4b is set, logic of the AND circuit 4f is no longer fulfilled and logic of the other AND circuit 4c is fulfilled, so that the high-frequency clock X is outputted from the AND circuit 4c. The OR circuit 4g outputs the high-frequency clock X as the clock CLK to the CPU 5 and to the peripheral modules 6, 7, so that the CPU 5 and the peripheral modules 6, 7 are driven by the high-frequency clock X.

When driving the microcomputer 1 by the low-frequency clock Xc, on the other hand, the CPU 5 outputs the reset signal RST by means of the program and feeds it to the reset terminal R of the RS flip-flop 4b. When the reset signal RST is inputted to the reset terminal R, the Q output of the RS flip-flop 4b turns to be "0" so that the RS flip-flop 4b is reset. As the RS flip-flop 4b is reset, logic of the AND circuit 4c of the selector 4 is no longer fulfilled and logic of the AND circuit 4f is fulfilled, so that the low-frequency clock Xc is outputted from the AND circuit 4f. The OR circuit 4g outputs the low-frequency clock Xc as the clock CLK to the CPU 5 and the peripheral modules 6, 7, so that the CPU 5 and the peripheral modules 6, 7 are driven by the low-frequency clock Xc. In this way, when the microcomputer 1 is not driven by the high-frequency clock X, oscillation of the oscillation circuit 2 that generates the high-frequency clock X is stopped thereby to reduce the power consumption. To return from the low-frequency clock Xc to the high-frequency clock X, the set signal ST is outputted by means of the program to set the RS flip-flop 4b.

While a microcomputer of this type in general generates a low-frequency clock to drive a timer, the low-frequency clock can also be used to drive the microcomputer. However, in a microcomputer of the prior art, even when the microcomputer is to be driven by the low-frequency clock only, it is required to first generate a high-frequency clock X then switch the clock to a low-frequency clock. Consequently, an oscillator must be connected also to an oscillation circuit that generates a high-frequency clock even when the microcomputer is to be driven by the low-frequency clock only, thus making the operation troublesome.

There has also been a problem that, because an oscillator unnecessary for driving the microcomputer must be connected merely for the purpose of switching the clock to the low-frequency clock, which costs high for users who want to drive the microcomputer only by the low-frequency clock.

SUMMARY OF THE INVENTION

This invention aims to solve the problems as described above, and an object of the invention is to provide a microcomputer that is easy to operate with the cost burden on the user reduced, by making it possible to drive the microcomputer by connecting only an oscillator that oscillates a clock required for driving the microcomputer.

The above and further objects and features of the invention will more fully be apparent from the following detailed description with accompanying drawings.

BRIEF DESCRIPTION OF THE DRAWINGS

FIG. 4A is a timing chart of a signal of the first embodiment;

FIG. 4B is a timing chart of a signal of the first embodiment;

FIG. 4C is a timing chart of a signal of the first embodiment;

FIG. 4D is a timing chart of a signal of the first embodiment;

FIG. 4E is a timing chart of a signal of the first embodiment;

FIG. 4F is a timing chart of a signal of the first embodiment;

FIG. 6A is a timing chart of a signal of the second embodiment;

FIG. 6B is a timing chart of a signal of the second embodiment;

FIG. 6C is a timing chart of a signal of the second embodiment;

FIG. 6D is a timing chart of a signal of the second embodiment;

FIG. 6E is a timing chart of a signal of the second embodiment;

FIG. 6F is a timing chart of a signal of the second embodiment;

FIG. 6G is a timing chart of a signal of the second embodiment;

DESCRIPTION OF THE PREFERRED EMBODIMENTS

The invention will now be described by referring to the accompanying drawings that show the preferred embodiments.

Embodiment 1

Figure 1:
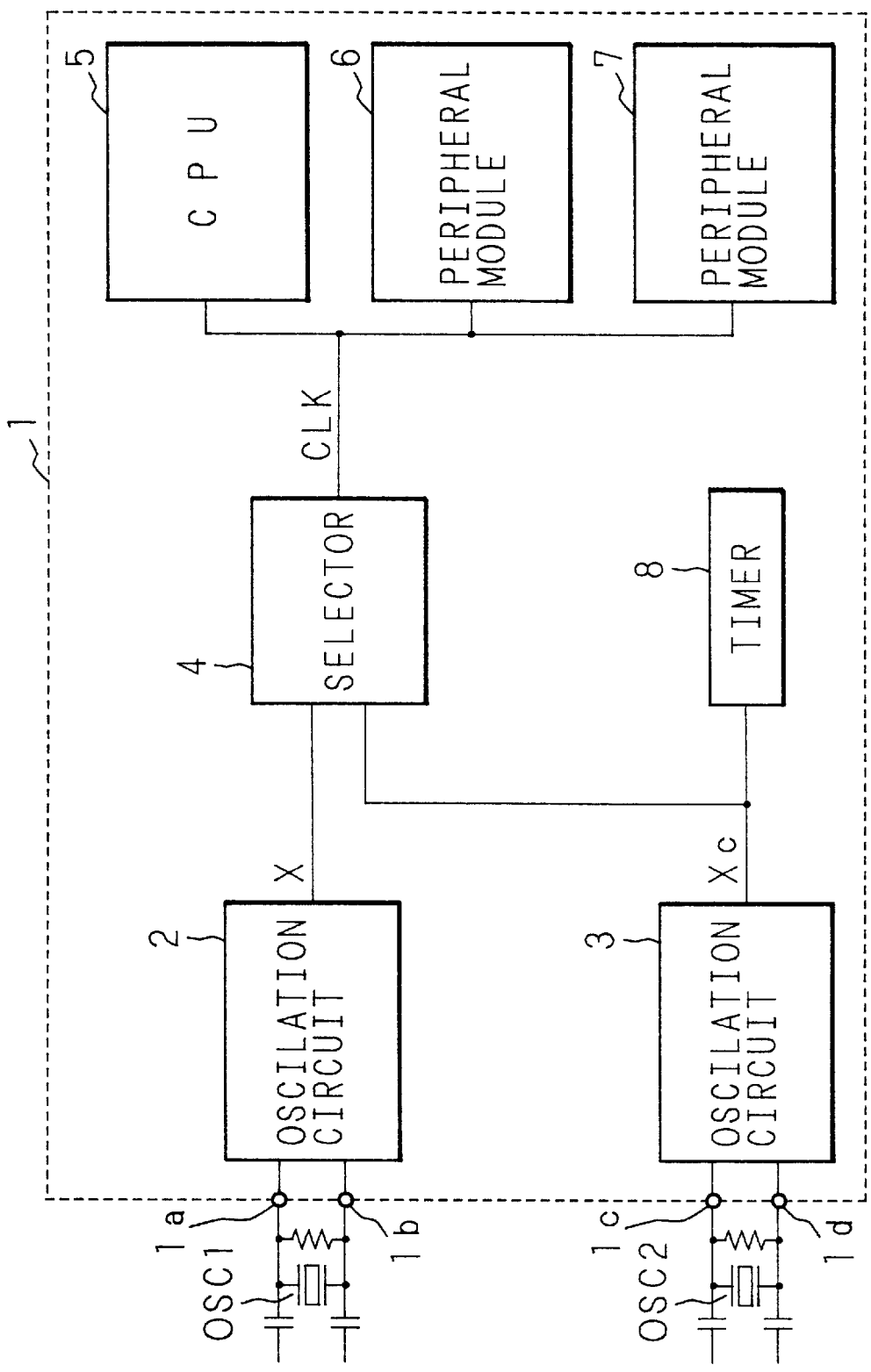
FIG. 1 is a block diagram showing the configuration of a microcomputer of the prior art.
Figure 2:
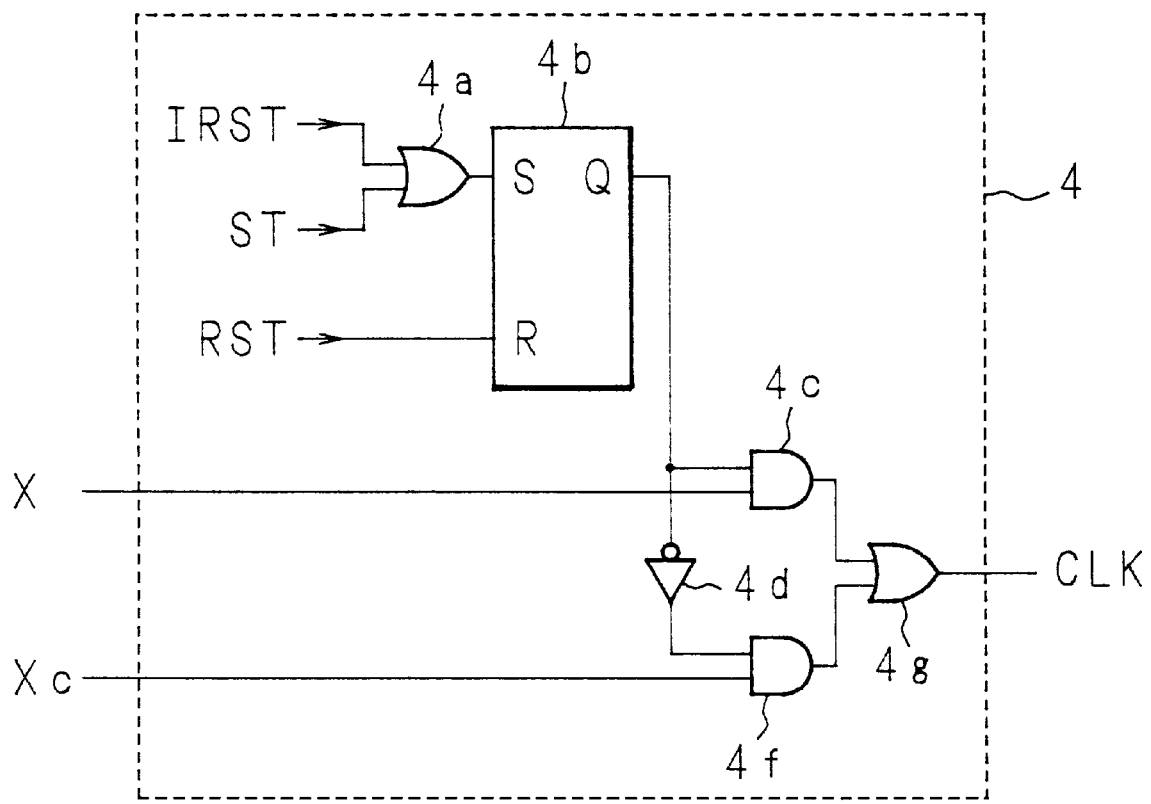
FIG. 2 is a block diagram showing the configuration of a selector of FIG. 1.
Figure 3:
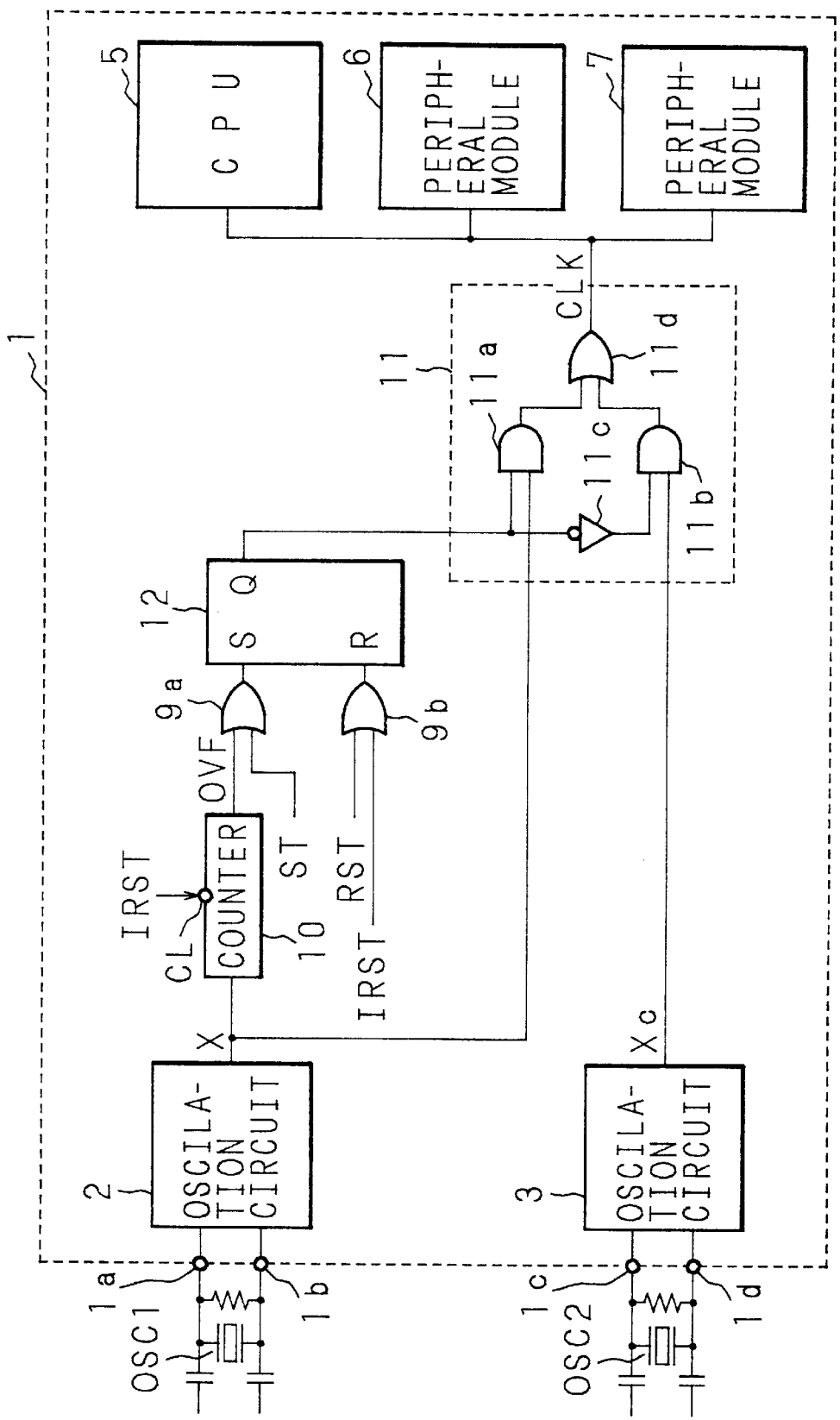
FIG. 3 is a block diagram showing the configuration of a first embodiment of a microcomputer of the invention.

FIG. 3 is a block diagram showing the configuration of a first embodiment of the microcomputer of the invention. The microcomputer 1 incorporates: an oscillation circuit 2 to generate a high-frequency clock X of a predetermined frequency in a range, for example, from 1 to 10 MHz; an oscillation circuit 3 to generate a low-frequency clock Xc of a frequency, for example, of 32 kHz; a counter 10 that is connected to the oscillation circuit 2 to count the high-frequency clock X and is provided with a terminal for the output of an overflow signal OVF when the count value overflows and a clear terminal CL to which an initial reset signal IRST to reset the microcomputer 1 is inputted at the time of start up, the count value thereof being cleared when the initial reset signal IRST is inputted to the clear terminal CL; a selector 11 that is connected to the two oscillation circuits 2, 3 and selects either one of the high-frequency clock X or the low-frequency clock Xc and feeds it to a CPU 5 or peripheral modules 6, 7; an OR circuit 9a whereto the overflow signal OVF of the counter 10 and a set signal ST generated by a program are inputted; an OR circuit 9b whereto the initial reset signal IRST and a reset signal RST generated by the program are inputted; an RS flip-flop 12 whereto an output signal of the OR circuit 9a is inputted to a set terminal S thereof and an output signal of the OR circuit 9b is-inputted to a reset terminal R thereof; the CPU 5; and peripheral modules 6, 7 such as an analog/digital converter, ROM, etc.

The selector 11 comprises an AND circuit 11a with two inputs, namely the Q output of the RS flip-flop 12 and the high-frequency clock X, an AND circuit 11b with two inputs, namely a signal obtained by inverting the Q output of the RS flip-flop 12 by an inverter 11c and the low-frequency clock Xc, and an OR circuit 11d with two inputs, namely the outputs of the two AND circuits 11a, 11b. The OR circuit 11d outputs the high-frequency clock X or the low-frequency clock Xc as a clock CLK to the CPU 5 and the peripheral modules 6, 7. The microcomputer 1 is also provided with terminals 1a, 1b for the connection of an oscillator OSC1 to the oscillation circuit 2, and terminals 1c, 1d for the connection of an oscillator OSC2 to the oscillation circuit 3.

Operation of the microcomputer having such the configuration as described above will be described below by referring to the timing charts of signals shown in FIG. 4. A case of operating the microcomputer 1 by connecting the oscillator OSC1 between the one pair of the terminals 1a, 1b and connecting the oscillator OSC2 between the other pair of the terminals 1c, 1d will first be described. As a power source for the microcomputer 1 is turned on, the oscillation circuits 2, 3 both oscillate so that the high-frequency clock X shown in FIG. 4B is outputted from the oscillation circuit 2 to the AND circuit 11a of the selector 11 and the low-frequency clock Xc is outputted from the oscillation circuit 3 to the AND circuit 11b of the selector 11. Upon turning on of the power source, the initial reset signal IRST of "0" shown in FIG. 4A is inputted to the clear terminal CL of the counter 10 to clear the count value of the counter 10, and the counter 10 begins counting down the high-frequency clock X starting with the initial value "FF" as shown in FIG. 4C. The initial reset signal IRST is fed by the OR circuit 9b and inputted to the reset terminal R of the RS flip-flop 12, thereby to reset the RS flip-flop 12.

When the RS flip-flop 12 is reset and the Q output turns to be "0", logic of the AND circuit 11b of the selector 11 is fulfilled so that the AND circuit 11b outputs the low-frequency clock Xc. When the count value of the counter 10 reaches "00" and then overflows, an overflow signal OVF is outputted via the AND circuit 9a to the RS flip-flop 12 as shown in FIG. 4D so that the RS flip-flop 12 is set. When the RS flip-flop 12 is set and the Q output turns to be "1" as shown in FIG. 4E, logic of the AND circuit 11b of the selector 11 is no longer fulfilled while logic of the AND circuit 11a is fulfilled so that the AND circuit ha outputs the high-frequency clock X to the OR circuit 11d. The OR circuit 11d feeds the high-frequency clock X as the clock CLK to the CPU 5 and the peripheral modules 6, 7 as shown in FIG. 4F.

Consequently, as far as a value corresponding to the period from generation to stabilization of the high-frequency clock X is set at the counter 10 as the initial value, the selector 11 automatically outputs the high-frequency clock X as the clock CLK at a time when the high-frequency clock X is stabilized to be accompanied with no noise, thereby making it possible to drive the microcomputer 1 with the stabilized high-frequency clock X.

A case of operating the microcomputer 1 by connecting only the oscillator OSC2 between the terminals 1c, 1d of the low-frequency clock Xc side will now be described. As the power source is turned on, only the oscillation circuit 3 oscillates so that the low-frequency clock Xc is inputted to the AND circuit 11b of the selector 11. Upon turning on of the power source, the initial reset signal IRST is inputted to the clear terminal CL of the counter 10 and is also inputted to the reset terminal R of the RS flip-flop 12 via the OR circuit 9b. Although the count value of the counter 10 is cleared upon the input of the initial reset signal IRST, the high-frequency clock X is not inputted so that the overflow signal OVF is not outputted, and therefore the RS flip-flop 12 is not set. Because the Q output of the RS flip-flop 12 that has been reset by the initial reset signal IRST is to be "0", logic of the AND circuit 11b of the selector 11 is fulfilled so that the low-frequency clock Xc is outputted. The OR circuit 11d feeds the low-frequency clock Xc as the clock CLK to the CPU 5 and the peripheral modules 6, 7.

A case of operating the microcomputer 1 by connecting only the oscillator OSC1 between the terminals 1a, 1b of the high-frequency clock X side will be described below. As the power source is turned on, only the oscillation circuit 2 oscillates so that the high-frequency clock X is inputted to the counter 10 and the AND circuit 11a of the selector 11. Upon turning on of the power source, the initial reset signal IRST is inputted to the clear terminal CL of the counter 10 to clear the count value of the counter 10. The initial reset signal IRST is also inputted via the OR circuit 9b to the reset terminal R of the RS flip-flop 12, thereby to reset the RS flip-flop 12 with the Q output being turned to be "0". As the RS flip-flop 12 is reset, logic of the AND circuit 11a is no longer fulfilled and therefore the high-frequency clock X is not outputted from the AND circuit 11a.

The counter 10 starts to count down when the count is cleared and, when the count reaches "00" and then overflows, outputs the overflow signal OVF to set the RS flip-flop 12. As the RS flip-flop 12 is set, the Q output is turned to be "1" and therefore logic of the AND circuit 11a is fulfilled, so that the high-frequency clock X is outputted from the AND circuit 11a. The OR circuit 11d feeds the high-frequency clock Xc as the clock CLK to the CPU 5 and the peripheral modules 6, 7.

As described above, the microcomputer of this embodiment can be operated by connecting the oscillator only to the oscillation circuit of the low-frequency clock Xc when driving the microcomputer by the low-frequency clock Xc, while connecting the oscillator only to the oscillation circuit of the high-frequency clock X when driving the microcomputer by the high-frequency clock X. This reduces the troublesome task of the user to connect the oscillator, making it suffice to connect only the oscillator that generates the clock required for driving the microcomputer to a terminal. Manufacturing cost is also reduced because the microcomputer can be used by connecting only one oscillator.

Embodiment 2

Figure 5:
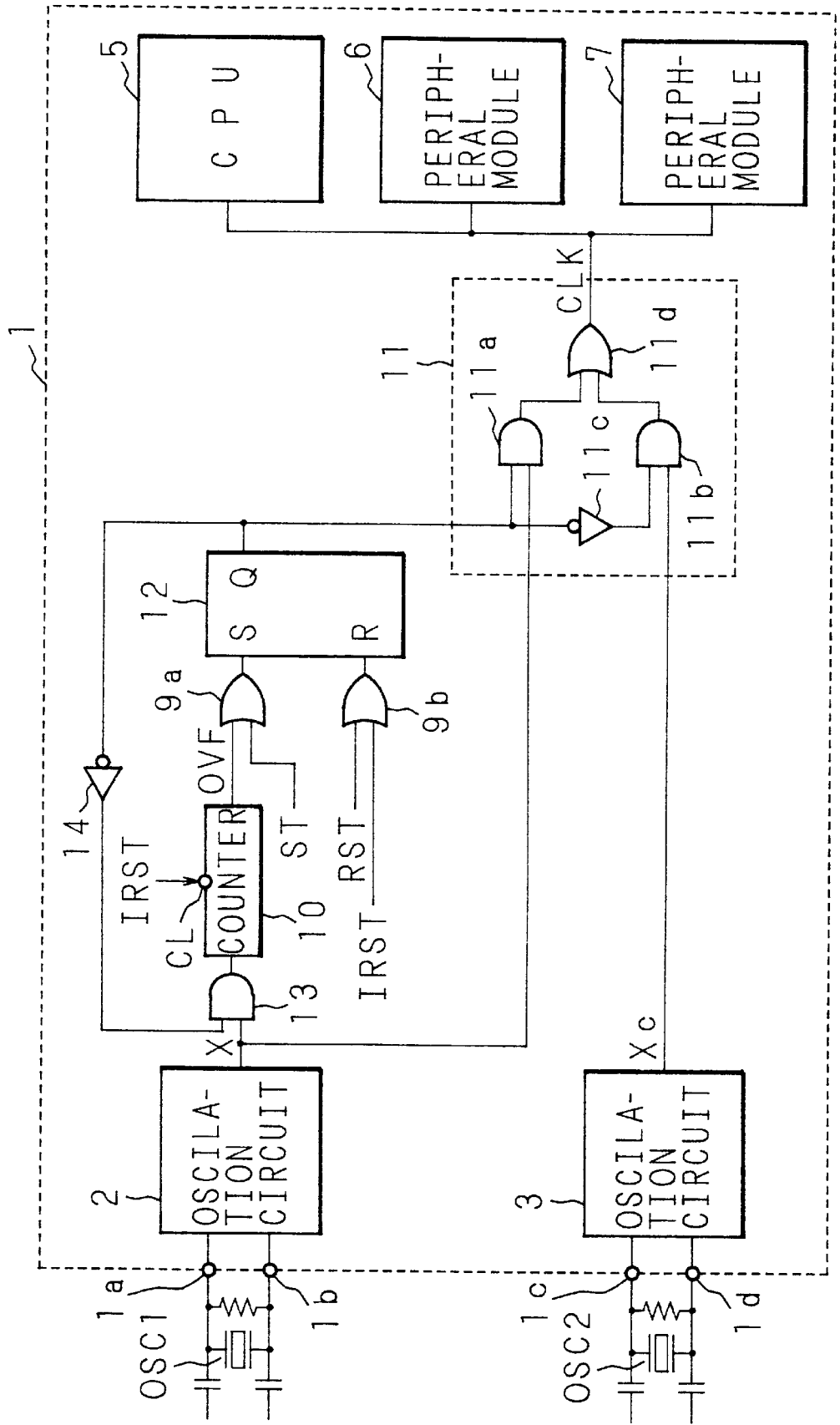
FIG. 5 is a block diagram showing the configuration of a second embodiment of the microcomputer of the invention.

FIG. 5 is a block diagram showing the configuration of a second embodiment of the microcomputer of the invention. This embodiment differs from the first embodiment shown in FIG. 3 in that an AND circuit 13, to which inputted an inverted signal of the Q output from the RS flip-flop 12 inverted by the inverter 14 and the high-frequency clock X from the oscillation circuit 2, is disposed between the oscillation circuit 2 of the high-frequency clock X and the counter 10. The rest of the configuration is similar to that of the microcomputer of the first embodiment shown in FIG. 3, and the corresponding parts are denoted by the same reference numerals.

Operation of the microcomputer having such the configuration as described above will be described below by referring to timing charts of signals shown in FIG. 6. A case of operating the microcomputer by connecting the oscillator OSC1 between the terminals 1a, 1b and connecting the oscillator OSC2 between the terminals 1c, 1d will first be described. As the power source for the microcomputer 1 is turned on, the two oscillation circuits 2, 3 both oscillate so that the oscillation circuit 2 generates the high-frequency clock X as shown in FIG. 6B and the oscillation circuit 3 generates the low-frequency clock Xc, the clocks being inputted to the AND circuits 11a, 11b of the selector 11, respectively. Upon turning on of the power source, the initial reset signal IRST is inputted to the clear terminal CL of the counter 10 to clear the count value of the counter 10, and is also inputted via the OR circuit 9b to the reset terminal R of the RS flip-flop 12 to reset the RS flip-flop 12. Although the count value of the counter 10 is cleared, logic of the AND circuit 13 is not fulfilled until the RS flip-flop is reset and the Q output turns to be "0", and therefore the high-frequency clock X is not inputted to the counter 10 and the count-down operation is not started. When the Q output of the RS flip-flop 12 which has been reset turns to be "0", logic of the AND circuit ha of the selector 11 is not fulfilled while logic of the AND circuit 11b is fulfilled, and therefore the low-frequency clock Xc is outputted from the AND circuit 11b.

As the Q output has turned to be "0", logic of the AND circuit 13 is fulfilled so that the high-frequency clock X is inputted to the counter 10, and the counter 10 starts to count down as shown in FIG. 6C. During the counting operation, the counter 10 consumes a current as shown in FIG. 6G. When the count value of the counter 10 overflows, the counter 10 outputs the overflow signal OVF. The overflow signal OVF is fed to the set terminal S of the RS flip-flop 12 via the OR circuit 9a, to set the RS flip-flop 12 so that the Q output turns to be "1" as shown in FIG. 6E. As the RS flip-flop 12 is set, logic of the AND circuit 11b of the selector 11 is no longer fulfilled and the logic of the AND selector 11a is fulfilled, so that the AND circuit 11a outputs the high-frequency clock X. The OR circuit 11d feeds the high-frequency clock X instead of the low-frequency clock Xc as the clock CLK to the CPU 5 and the peripheral modules 6, 7.

Because logic of the AND circuit 13 is no longer fulfilled when the RS flip-flop 12 is set, the high-frequency clock X to the counter 10 is inhibited to be inputted thereby to stop the counter 10 operation. Therefore, the power consumption by the counter 10 becomes almost zero as shown in FIG. 6G. To sum up, after the RS flip-flop 12 has been set to switch the clock from the low-frequency clock Xc to the high-frequency clock X, the counter 10 stops the counting operation and the current consumed in the counter 10 reduces.

When the oscillator OSC1 is connected between the terminals 1a, 1b of the high-frequency clock X side, or the oscillator OSC2 is connected between the terminals 1c, 1d of the low-frequency side, a similar operation is obtained as that of the microcomputer of the first embodiment shown in FIG. 3. However, also in these cases similar to the case of the first embodiment, a current consumed in the counter 10 decreases when the RS flip-flop 12 is set because the high-frequency clock X to the counter 10 is inhibited to be inputted.

Embodiment 3

Figure 7:
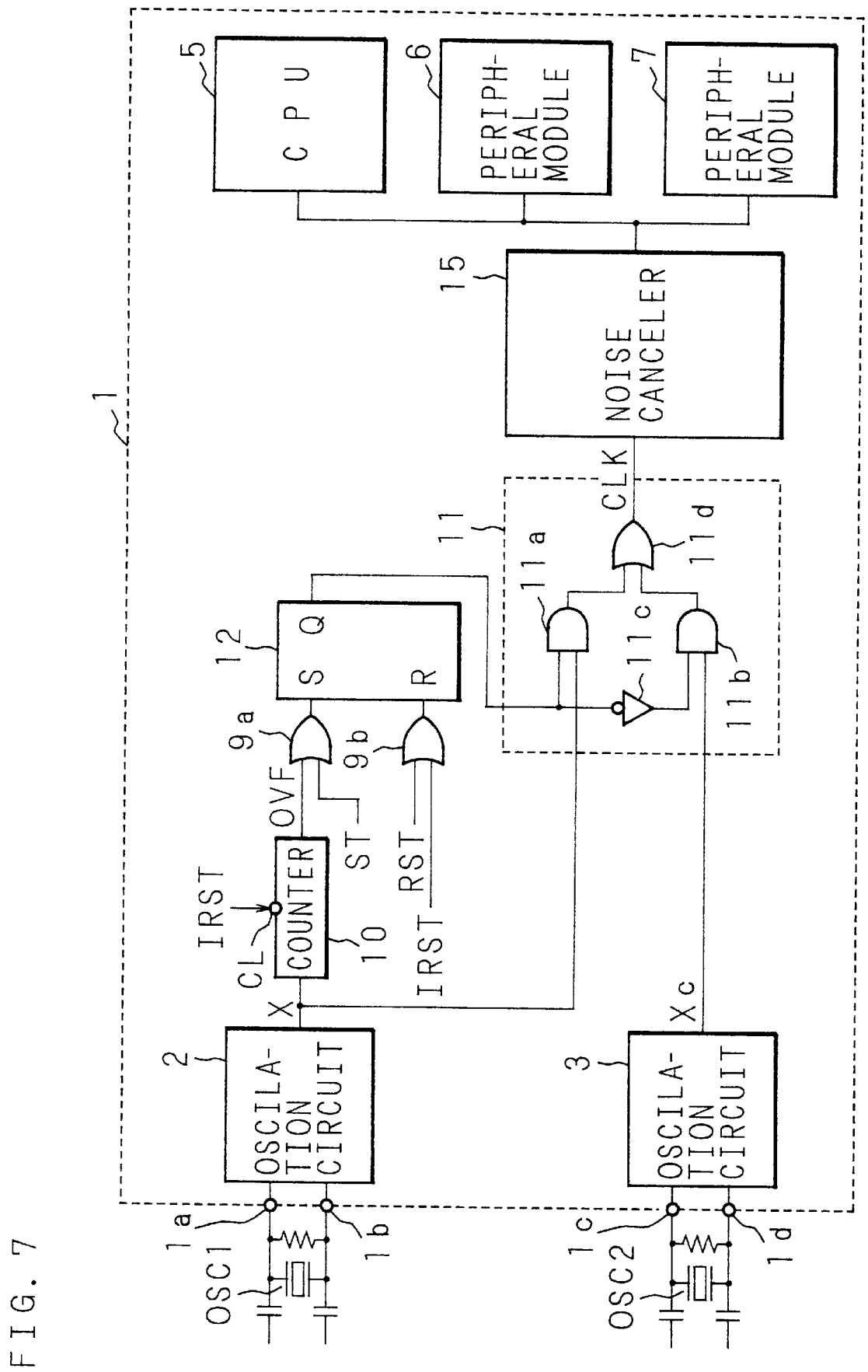
FIG. 7 is a block diagram showing the configuration of a third embodiment of the microcomputer of the invention.

FIG. 7 is a block diagram showing the configuration of a third embodiment of the microcomputer of the invention. This embodiment differs from the first embodiment shown in FIG. 3 in that a noise canceler 15 that removes a noise occurred in the clock CLK, is disposed between the output terminal of the OR circuit 11d of the selector 11, and the CPU 5 and the peripheral modules 6, 7. The rest of the configuration is similar to that of the microcomputer of the first embodiment shown in FIG. 3, and the corresponding parts are denoted by the same reference numerals.

Figure 8:
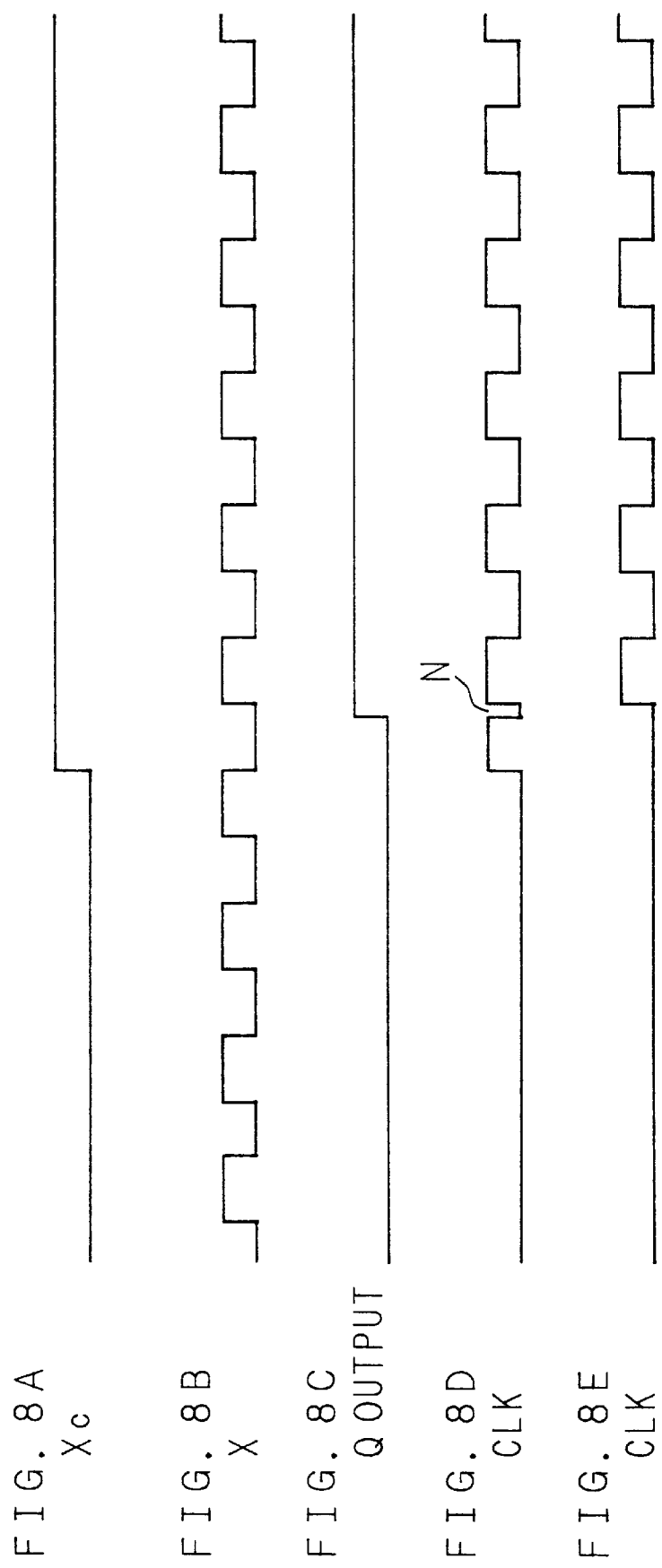
FIG. 8A is a timing chart of a signal of the third embodiment.
FIG. 8B is a timing chart of a signal of the third embodiment.
FIG. 8C is a timing chart of a signal of the third embodiment.
FIG. 8D is a timing chart of a signal of the third embodiment.
FIG. 8E is a timing chart of a signal of the third embodiment.

Operation of the microcomputer having such the configuration as described above will be described below by referring to the timing charts of signals shown in FIG. 8. In this microcomputer, similar to the microcomputer of the first embodiment shown in FIG. 3, when the oscillators OSC1, OSC2 are connected to the two oscillation circuits 2, 3, respectively, the clock is switched from the low-frequency clock Xc to the high-frequency clock X after a lapse of a specified period of time required for the counter 10 to finish counting, thereby to drive the CPU 5 and the peripheral modules 6, 7 with the high-frequency clock X which has been selected. When one of the oscillators OSC1 and OSC2 is connected to the oscillation circuit 2 or 3, on the other hand, the CPU 5 and the peripheral modules 6, 7 are driven with the clock generated by the oscillation circuit 2 or 3 whereto the oscillator is connected.

When the high-frequency clock X and the low-frequency clock Xc are respectively outputted from the oscillation circuits 2, 3, with both oscillators OSC1, OSC2 being connected thereto, respectively, as shown in FIG. 8B and FIG. 8A, the counter 10 outputs the overflow signal OVF to set the RS flip-flop 12 when the selector 11 selects the low-frequency clock Xc and, when the Q output turns to be "1" as shown in FIG. 8C, namely, at the time when the selector 11 switches the clock from the low-frequency clock Xc to the high-frequency clock X, a noise N of short negative pulses may occur as shown in FIG. 8D. The microcomputer of this embodiment removes such the noise N by the noise canceler 15 and thereby outputs as the clock CLK the high-frequency clock X that without including the noise N. Therefore, because the CPU 5 and the peripheral modules 6, 7 are driven surely without a malfunction, the microcomputer has a wide range of application and the operational reliability improves.

Embodiment 4

Figure 9:
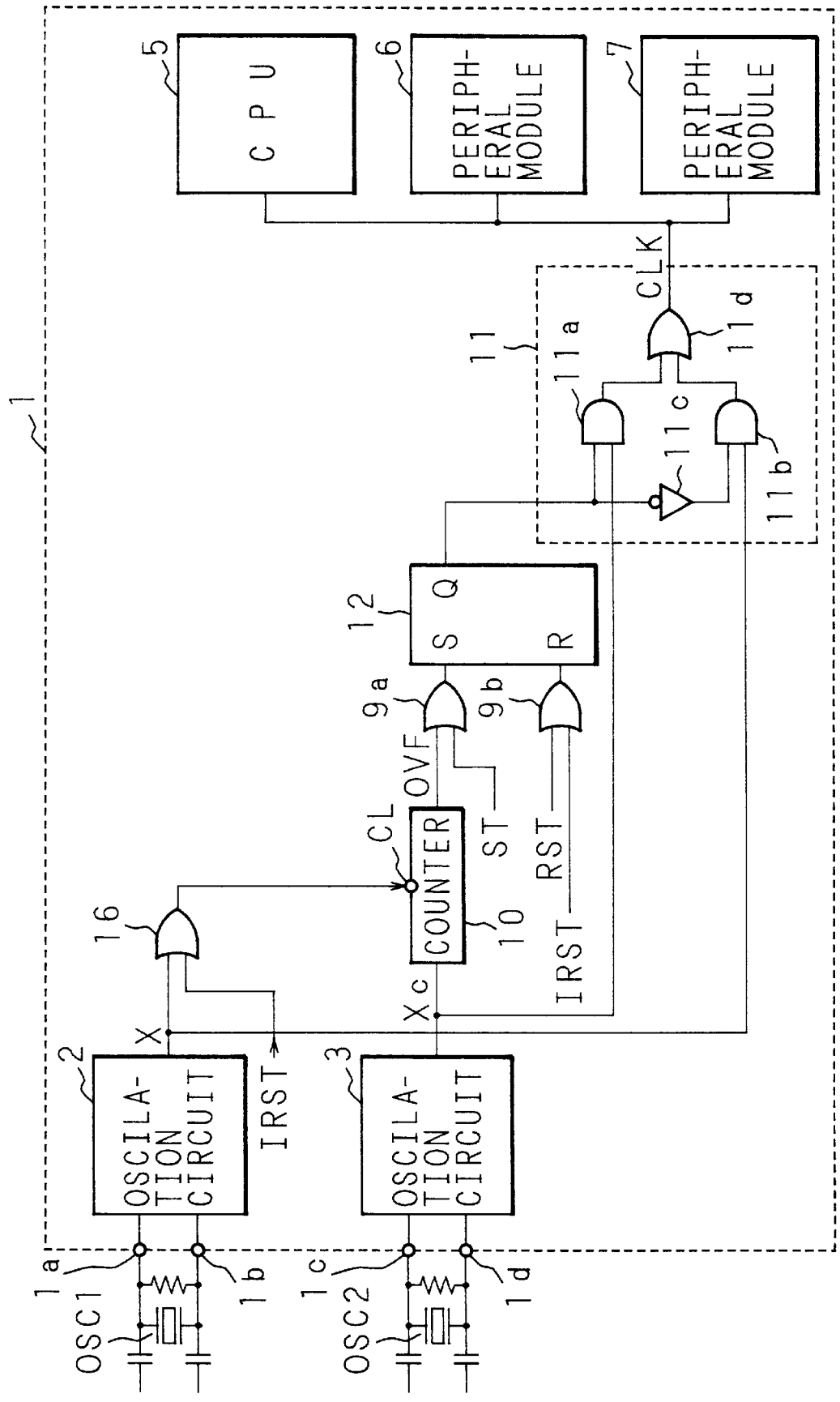
FIG. 9 is a block diagram showing the configuration of a fourth embodiment of the microcomputer of the invention.

FIG. 9 is a block diagram showing the configuration of a fourth embodiment of the microcomputer of the invention. In this embodiment, contrary to the first embodiment shown in FIG. 3, the counter 10 is connected to the oscillation circuit 3 of the low-frequency clock Xc, while the oscillation circuit 2 of the high-frequency clock X is connected to the clear terminal CL of the counter 10 via an OR circuit 16 that receives the initial reset signal IRST as one of two inputs, and is also connected to another input terminal of the AND circuit 11b which receives, as one of two inputs, an inverted signal of the Q output from the RS flip-flop 12 inverted by an inverter 11c. The oscillation circuit 3 of the low-frequency clock Xc is connected to the counter 10 and is also connected to another input terminal of the AND circuit 11a which receives, as one of two inputs, the Q output of the RS flip-flop 12. The rest of the configuration is similar to that of the microcomputer of the first embodiment shown in FIG. 3, and the corresponding parts are denoted by the same reference numerals.

Operation of the microcomputer having such the configuration as described above will be described below. A case of operating the microcomputer by connecting the oscillator OSC1 between the terminals 1a, 1b and connecting the oscillator OSC2 between the terminals 1c, 1d will first be described. As the power source for the microcomputer 1 is turned on, the oscillation circuits 2, 3 both oscillate so that the oscillation circuit 2 outputs the high-frequency clock X to the OR circuit 16 and to the AND circuit 11b of the selector 11, while the oscillation circuit 3 outputs the low-frequency clock Xc to the counter 10 and to the AND circuit 11a of the selector 11. Upon turning on of the power source, the initial reset signal IRST is inputted to the reset terminal R of the RS flip-flop 12 via the OR circuit 9b, thereby to reset the RS flip-flop 12 and turn the Q output to be "0". The initial reset signal IRST is inputted to the clear terminal CL of the counter 10 via the OR circuit 16. Although the count value of the counter 10 is cleared to start counting of the low-frequency clock Xc, the count valued does not overflow because the count value is cleared every time the high-frequency clock X is inputted to the clear terminal CL via the OR circuit 16. Because the overflow signal OVF is not outputted, the RS flip-flop 12 is not set and therefore the low-frequency clock Xc is not outputted as the clock CLK. As the RS flip-flop 12 is reset, on the other hand, logic of the AND circuit 11b of the selector 11 is fulfilled so that the high-frequency clock X is outputted from the AND circuit 11b, and the OR circuit 11d feeds the high-frequency clock X to the CPU 5 and the peripheral modules 6, 7 as the clock CLK.

In this case, when the oscillation circuit 2 stops the oscillation the high-frequency clock X becomes not to be inputted to the clear terminal CL of the counter 10, so that the counter 10 continues to count down the low-frequency clock Xc and, outputs the overflow signal OVF when the count value overflows. When the RS flip-flop 12 is set by the overflow signal OVF with the Q output turning to be "1", logic of the AND circuit 11a is fulfilled so that the low-frequency clock Xc is outputted from the AND circuit 11a. The OR circuit 11d outputs the low-frequency clock Xc as the clock CLK so that the CPU 5 and the peripheral modules 6, 7 are driven by the low-frequency clock Xc. Because the high-frequency clock X is not inputted to the clear terminal CL of the counter 10, the counter 10 is not cleared and therefore does not output the overflow signal OVF. Consequently, the RS flip-flop 12 remains being set so that the low-frequency clock Xc continues to be outputted as the clock CLK.

Now a case of operating the microcomputer 1 by connecting only the oscillator OSC2 between the terminals 1c, 1d of the low-frequency clock Xc side will be described below. As the power source for the microcomputer 1 is turned on, only the oscillation circuit 3 oscillates so that the low-frequency clock Xc is outputted. As the power source is turned on, the initial reset signal IRST is inputted to the reset terminal R of the RS flip-flop 12 via the OR circuit 9b to reset the RS flip-flop 12 and the Q output turns to be "0". The initial reset signal IRST is also inputted to the clear terminal CL of the counter 10 via the OR circuit 16, so that the count value of the counter 10 is cleared to start counting of the low-frequency clock Xc. When the counter 10 counts down the low-frequency clock Xc and, as the count value overflows, outputs the overflow signal OVF, the overflow signal OVF is inputted to the set terminal S of the RS flip-flop 12 via the OR circuit 9a so that the RS flip-flop 12 is set and the Q output turns to be "1". As the RS flip-flop 12 is set, logic of the AND circuit 11a is fulfilled so that the low-frequency clock Xc is outputted from the AND circuit 11a. The OR circuit 11d outputs the low-frequency clock Xc as the clock CLK so that the CPU 5 and the peripheral modules 6, 7 are driven by the low-frequency clock Xc. Because the high-frequency clock X is not inputted to the clear terminal CL of the counter 10, the count value is not cleared and therefore the counter 10 does not output the overflow signal OVF. Consequently, the RS flip-flop 12 remains being set so that the low-frequency clock Xc continues to be outputted as the clock CLK.

A case of operating the microcomputer 1 by connecting only the oscillator OSC1 between the terminals 1a, 1b of the high-frequency clock X side will be described below. As the power source for the microcomputer 1 is turned on, only the oscillation circuit 2 oscillates so that the high-frequency clock X is fed to the clear terminal CL of the counter 10 and to the AND circuit 11b of the selector 11. Because the low-frequency clock Xc is not inputted, the counter 10 does not output the overflow signal OVF. Upon turning on of the power source, the initial reset signal IRST is inputted to the reset terminal R of RS flip-flop 12 to reset the RS flip-flop 12 and the Q output turns to be "0". As the RS flip-flop 12 is reset, logic of the AND circuit 11b is fulfilled and therefore the high-frequency clock X is outputted from the AND circuit 11b. The OR circuit 11d outputs the high-frequency clock X as the clock CLK so that the CPU 5 and the peripheral modules 6, 7 are driven by the high-frequency clock X.

Figure 10:
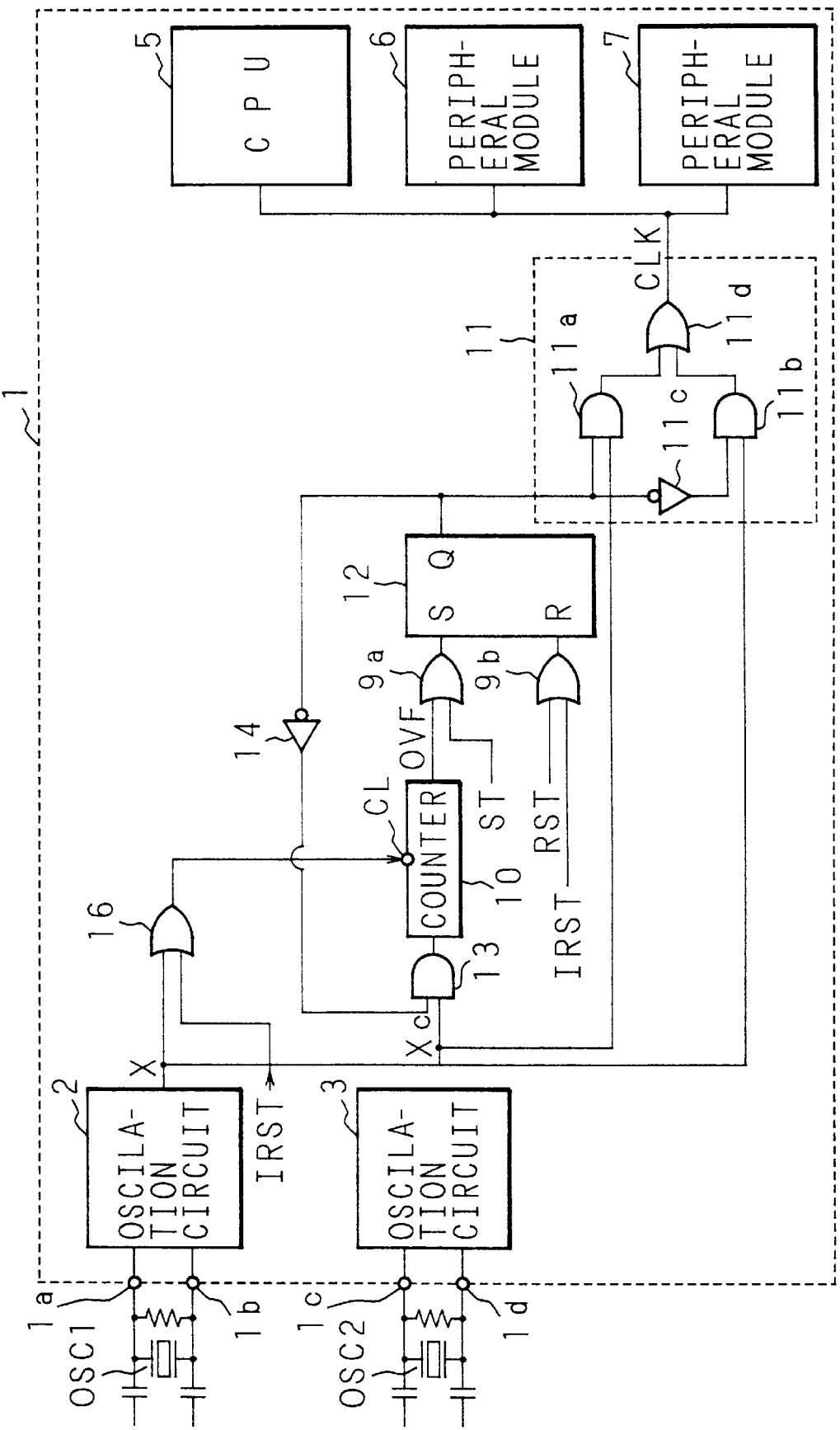
FIG. 10 is a block diagram showing the configuration of a modification of the fourth embodiment.

In case the AND circuit 13 that receives the low-frequency clock Xc and an inverted signal of the Q output from the RS flip-flop 12 inverted by the inverter 14, is connected between the oscillation circuit 3 and the counter 10 as shown in FIG. 10, a current consumed in the counter 10 reduces similar to the second embodiment shown in FIG. 5.

Figure 11:
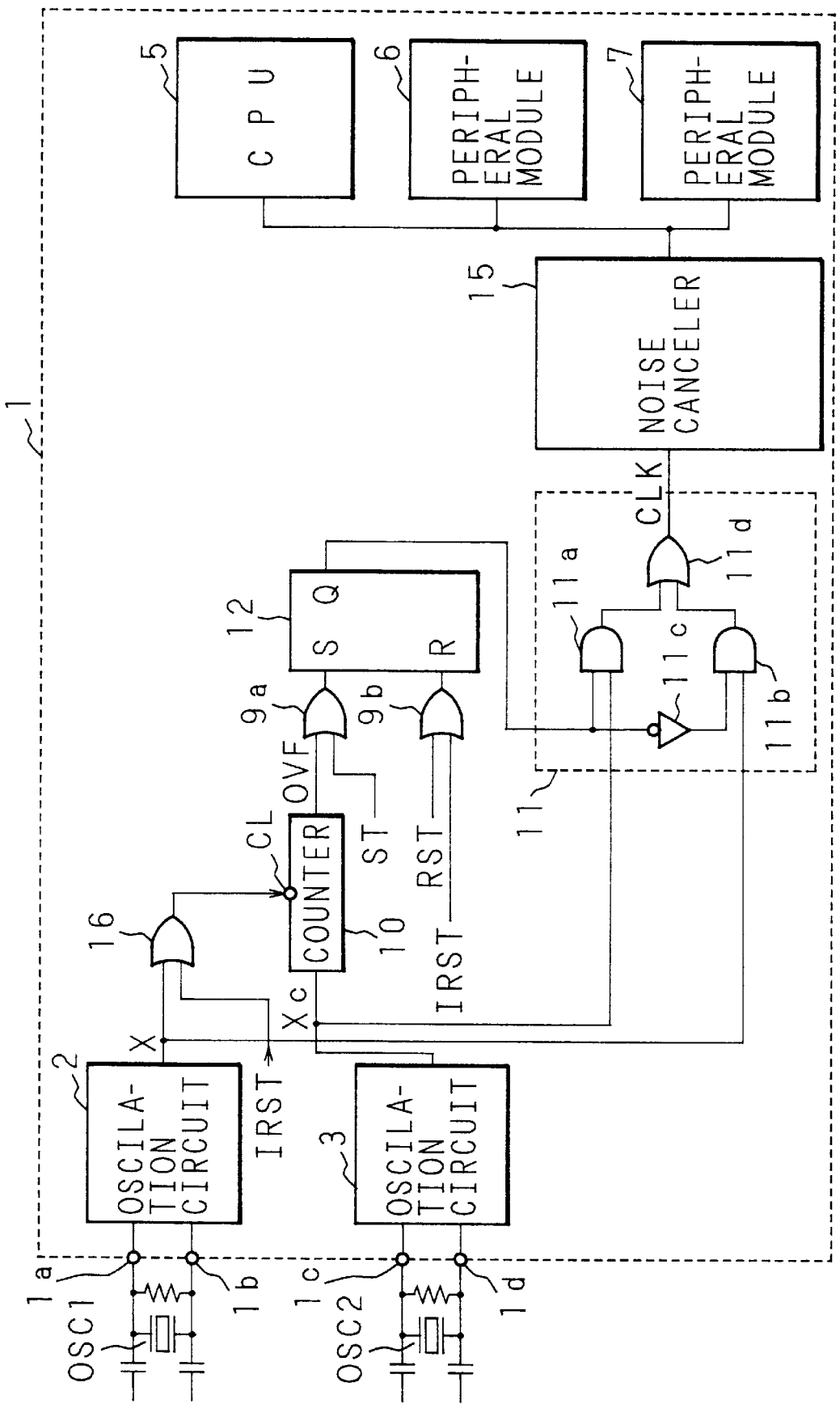
FIG. 11 is a block diagram showing the configuration of another modification of the fourth embodiment.

Also in case the noise canceler 15 is connected between the output terminal of the OR circuit 11d of the selector 11, and the CPU 5 and the modules 6, 7 as shown in FIG. 11, a noise occurred in the high-frequency clock X when switching the clock from the low-frequency clock Xc to the high-frequency clock X is removed similarly to the case of the third embodiment shown in FIG. 7.

Embodiment 5

Figure 12:
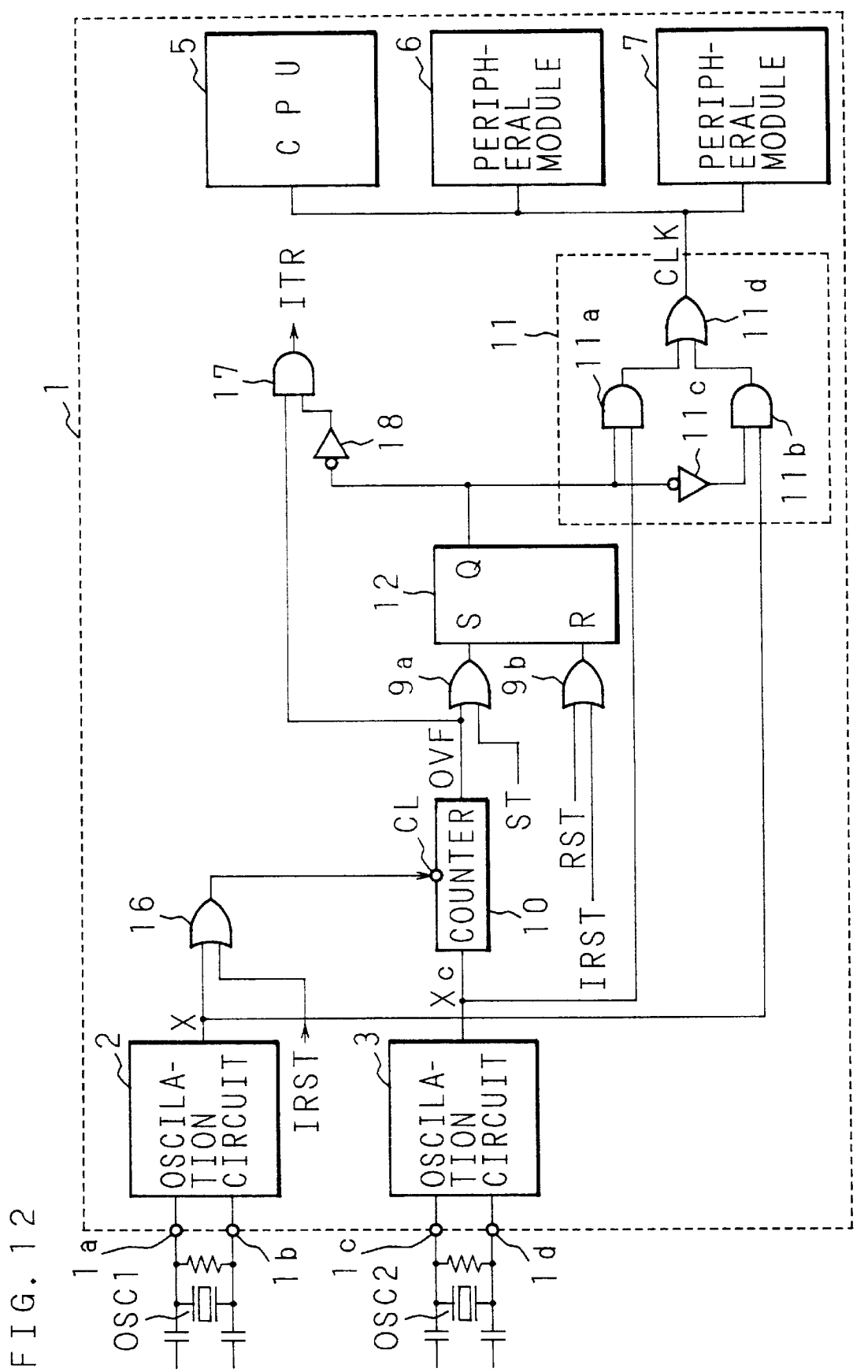
FIG. 12 is a block diagram showing the configuration of a fifth embodiment of the microcomputer of the invention.

FIG. 12 is a block diagram showing the configuration of a fifth embodiment of the microcomputer of the invention. This embodiment differs from the fourth embodiment shown in FIG. 9 in that an AND circuit 17, that receives the overflow signal OVF from the counter 10 as one input and an inverted signal of the Q output from the RS flip-flop 12 inverted by an inverter 18 as another input, is provided to output an interrupt request signal ITR to the CPU 5. The rest of the configuration is similar to that of the fourth embodiment shown in FIG. 9, and the corresponding parts are denoted by the same reference numerals.

Operation of the microcomputer having such the configuration as described above will be described below by referring to the timing charts of signals shown in FIG. 13. Operation of this microcomputer, when both the oscillators OSC1, OSC2 are connected and the high-frequency clock X and the low-frequency clock Xc are generated, is similar to that of the microcomputer of the fourth embodiment shown in FIG. 9, and the selector 11 outputs the high-frequency clock X as the clock CLK. When generation of the high-frequency clock X stops, the counter 10 outputs the overflow signal OVF to set the RS flip-flop 12, so that the AND circuit 11a outputs the low-frequency clock Xc and the selector 11 outputs the low-frequency clock Xc as the clock CLK.

When the microcomputer is used with only connecting the oscillator OSC2, only the low-frequency clock Xc is generated. And similar to the fourth embodiment, the counter 10 counts the low-frequency clock Xc and outputs the overflow signal OVF when the count value overflows, so that the RS flip-flop 12 is set and the selector 11 outputs the low-frequency clock Xc as the clock CLK. Further, also in case of operation with only connecting the OSC1, similar to the case of the fourth embodiment, the selector 11 outputs the high-frequency clock X as the clock CLK with the RS flip-flop 12 being reset.

Figure 13A:
FIG. 13A is a timing chart of a signal of the fifth embodiment.
Figure 13B:
FIG. 13B is a timing chart of a signal of the fifth embodiment.
Figure 13C:
FIG. 13C is a timing chart of a signal of the fifth embodiment.
Figure 13D:
FIG. 13D is a timing chart of a signal of the fifth embodiment.

In case generation of the high-frequency clock X is interrupted due to a disturbance, a circuit fault or the like when the microcomputer 1 is driven by the high-frequency clock X while both the high-frequency clock X and the low-frequency clock Xc are generated as shown in FIGS. 13A and B, the count value of the counter 10 becomes impossible to be cleared and the counter 10 begins to count the low-frequency clock Xc. When the count value overflows as shown in FIG. 13C, the counter 10 outputs the overflow signal OVF (FIG. 13D) to set the RS flip-flop 12.

Figure 13E:
FIG. 13E is a timing chart of a signal of the fifth embodiment.
Figure 13F:
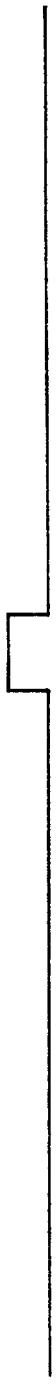
FIG. 13F is a timing chart of a signal of the fifth embodiment.

While the low-frequency clock Xc is outputted from the AND circuit 11a when the RS flip-flop 12 is set, the Q output of the RS flip-flop 12 is "0" as shown in FIG. 13E at the time when the overflow signal OVF is outputted. Consequently, an inverted signal of the Q output from the RS flip-flop 12 inverted by the inverter 18 and the overflow signal OVF are inputted to the AND circuit 17 to fulfill logic of the AND circuit. Then the AND circuit 17 outputs the interrupt request signal ITR shown in FIG. 13F to the CPU 5 to inform that the clock CLK that is outputted from the selector 11 is switched from the high-frequency clock X to the low-frequency clock Xc. Upon outputting of the interrupt request signal ITR, the CPU 5 detects that the clock CLK has been switched from the high-frequency clock X to the low-frequency clock Xc due to a failure in the oscillation.

Although, the counter in the above embodiments is a down counter, similar effects can be obtained by using an up counter or an up-down counter. Also it is needless to say that the counter and the RS flip-flop in the above embodiments are mere examples and may be replaced by other circuits having equivalent functions.

Moreover, although the clock to drive the microcomputer is switched by a selector by setting and resetting the RS flip-flop in the embodiments described above, it may be switched by a circuit that selects the high-frequency clock or the low-frequency clock by means of software.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A microcomputer incorporating two oscillation circuits, with a first oscillation circuit generating a clock having higher frequency than that of a second oscillation circuit, the microcomputer being reset by an initial reset signal and being driven by a clock generated by the first or the second oscillation circuit, comprising:

counting means that is cleared by the initial reset signal and counts the number of clock pulses that are outputted by the first oscillation circuit and outputs an overflow signal when the count value overflows;

latch means that is rest by the initial reset signal or a reset instruction of a program, and is set by the overflow signal or a set instruction of the program; and clock selecting means for selecting the output of the second oscillation circuit when said latch means is reset by the initial reset signal, and selecting the output of the first oscillation circuit when the latch means is set, but selecting the output of the second oscillation circuit when the latch means is reset by the reset instruction of the program or when the latch means is not set and continues to be reset.

2. The microcomputer as claimed in claim 1, further comprising means for inhibiting the input of the clock to the timing means after the latch means is set.

3. The microcomputer as claimed in claim 1, wherein the timing means comprises a counter which counts a number of clock pulses that are outputted by the first oscillation circuit and outputs an overflow signal when the count value overflows, and the latch means is an RS flip-flop.

4. The microcomputer as claimed in claim 1 further comprising a noise canceler that is connected to an output terminal of the clock selecting means and removes a noise from the clock selected by the clock selecting means.

5. The microcomputer as claimed in claim 1, wherein the clock selecting means comprises a logic circuit.

6. The microcomputer as claimed in claim 1, wherein the clock selecting means is a circuit that selects the clock according to a program.

7. A microcomputer incorporating two oscillation circuits, with the first oscillation circuit generating a clock having higher frequency than that of the second oscillation circuit, the microcomputer being reset by an initial reset signal and being driven by a clock generated by the first or the second oscillation circuit, comprising:

counting means that is cleared by the initial reset signal or the clock generated by the first oscillation circuit and counts the number of clock pulses that are outputted by the second oscillation circuit to output an overflow signal when the count value overflows;

latch means that is reset by the initial reset signal or a reset instruction of a program, and is set by the overflow signal or a set instruction of the program; and clock selecting means for selecting the clock of the second oscillation circuit when the latch means is set, but selecting the clock of the first oscillation circuit when the latch means is reset.

8. The microcomputer as claimed in claim 7, further comprising means for inhibiting the input of the clock to the counting means after the latch means is set.

9. The microcomputer as claimed in claim 7, wherein the counting means is a timer and the latch means is an RS flip-flop.

10. The microcomputer as claimed in claim 7, further comprising a noise canceler that is connected to an output terminal of the clock selecting means and removes a noise from the clock selected by the clock selecting means.

11. The microcomputer as claimed in claim 7, further comprising a logic circuit that outputs an interrupt request signal to a CPU when both the overflow signal and a signal generated according to an output of the latch means which is reset are inputted.

12. The microcomputer as claimed in claim 7, wherein the clock selecting means comprises a logic circuit.

13. The microcomputer as claimed in claim 7, wherein the clock selecting means is a circuit that selects the clock according to a program.

14. The microcomputer as claimed in claim 7, further comprising a CPU and at least a peripheral module connected to the clock selecting means, to which a clock generated by the clock selecting means is supplied.

* * * * *